United States Patent [19]

Engholdt

[11] 4,139,153

[45] Feb. 13, 1979

[54] ELECTRONIC REVERSIBLE MOTOR OPERATED VALVE ASSEMBLY

[75] Inventor: Richard K. Engholdt, Wauwatosa, Wis.

[73] Assignee: Erie Manufacturing Company, Milwaukee, Wis.

[21] Appl. No.: 763,509

[22] Filed: Jan. 28, 1977

[51] Int. Cl.² .................. F16K 31/04; H02P 1/40; F16K 11/20

[52] U.S. Cl. .................. 236/78 C; 137/595; 251/133; 318/290; 318/256

[58] Field of Search .................. 251/133; 318/290, 256; 236/78 C

[56] References Cited

U.S. PATENT DOCUMENTS

| 1,841,559 | 1/1932 | Uehling | 236/78 C |
| 3,896,355 | 7/1975 | Guicheteau | 318/256 X |

Primary Examiner—Arnold Rosenthal
Attorney, Agent, or Firm—Michael, Best & Friedrich

[57] ABSTRACT

An electronic reversible motor operated valve assembly adapted to be controlled by a two-wire thermostat. The assembly includes a valve casing having a pivotally mounted valve member, and a reversible motor drive unit having forward and reverse motor windings which, when alternately energized, effect pivoting of the valve member between closed and open positions to control fluid flow through the valve casing. The assembly includes a triac having a first annode and a gate coupled across the two wires of the thermostat, and having a second annode and the gate coupled across separate end terminals of the motor windings. Commonly connected end terminals of the motor windings and the first annode of the triac are coupled to an A/C power source to afford biasing the triac. When the thermostat switches to an off state, the triac is biased on and the reverse motor winding is energized to pivot the valve to the open position. When the thermostate switches to an on state, the triac is biased off and the forward motor winding is alternately energized to pivot the valve to the closed position.

11 Claims, 3 Drawing Figures

ELECTRONIC REVERSIBLE MOTOR OPERATED VALVE ASSEMBLY

BACKGROUND OF THE INVENTION

I. Field of the Invention

The invention relates generally to motor operated valves, and more particularly, to an electronic reversible motor operated valve assembly adapted to be controlled by a two-wire switch.

II. Description of the Prior Art

Competition in the manufacture and sale of motor operated valves is very intense, with the result that the industry is constantly striving to reduce the cost of manufacture and installation of such motor operated valves.

In many commercial applications, it is desirable to utilize a reversible motor operated valve having separate forward and reverse motors or motor windings capable of powering or pivoting a valve member into both open and closed positions. Heretofore, in order to control or alternately energize the forward and reverse motor windings, a valve assembly including a three-wire switch, or a two-wire switch supplemented by additional contacts and a relay, has been required.

This invention is concerned with this general area, and has among its objects to provide an electronic reversible motor operated valve assembly which is durable and economical to manufacture, and which can be controlled by a relatively inexpensive two-wire switch without requiring the use of additional contacts and a relay.

This invention also has among its objects to provide a valve assembly of the type described which can also be utilized to control or switch a relatively large auxiliary load without requiring the use of an additional power relay.

Another object of this invention is to provide an electronic reversible motor operated dual valve assembly including two valve assemblies of the type described, and which can be controlled by a three-wire switch.

SUMMARY OF THE INVENTION

The invention provides an electronic motor operated valve assembly having first and second motor windings coupled to semiconductor switching means which can be biased on by an A/C power source. The assembly is adapted so that the alternate energizing of the motor windings and opening and closing of a valve can be controlled by a two-wire switch.

More particularly, the invention provides an electronic reversible motor operated valve assembly which is adapted to be controlled by a switch such as a thermostat having first and second wires, the switch selectively providing a conducting state and a non-conducting state between the two wires. The assembly includes first and second motor windings having commonly connected end terminals and separate end terminals. The assembly also includes semiconductor switching means such as a triac which can be biased on by an A/C power source and which has first, second and third terminals. The first terminal is coupled to the first wire of the switch, the second terminal is coupled to the separate end terminal of the second motor winding, and the third terminal is coupled to the second wire of the switch and to the separate end terminal of the first motor winding. The first terminal and the commonly connected end terminals are adapted for coupling to an A/C power source to afford biasing the semiconductor switching means and to afford alternately energizing the motor windings. When the switch provides a non-conducting state, the semiconductor switching means is biased on so that the first motor winding is energized by being coupled to the A/C power source through the semiconductor switching means. When the switch provides a conducting state, the semiconductor switching means is biased off and the second motor winding is alternately energized by being coupled to the A/C power source through the switch.

In one embodiment of the invention the valve assembly includes a valve casing having a pivotally mounted valve member secured to a valve stem and movable between an open and a closed position to control fluid flow through the valve casing. The valve assembly also includes reversible motor means including a rotatable drive shaft upon which is mounted the first and second motor windings. Gear drive train means operatively connect the drive shaft to the valve stem and the valve member. The first and second motor windings are alternately energized to effect rotation of the drive shaft and pivoting of the valve member in opposite directions between the open and closed positions.

In another embodiment of the invention, an auxiliary load, such as a fan or pump motor, is coupled to the second terminal of the semiconductor switching means or triac and to the motor winding common end terminals. When the switch provides a non-conducting state and the valve is pivoted to the open position, the load is energized by being coupled to the A/C power source through the triac without requiring the use of a power relay.

In another embodiment of the invention, an electronic reversible motor operated dual valve assembly is provided which includes a pair of valve assemblies of the type described, and which can be controlled by a three-wire switch.

Other objects, features and advantages of the embodiments of the invention will become known by reference to the following drawings, general description, and the appended claims.

GENERAL DESCRIPTION OF THE PREFERRED EMBODIMENTS

Figure 1:
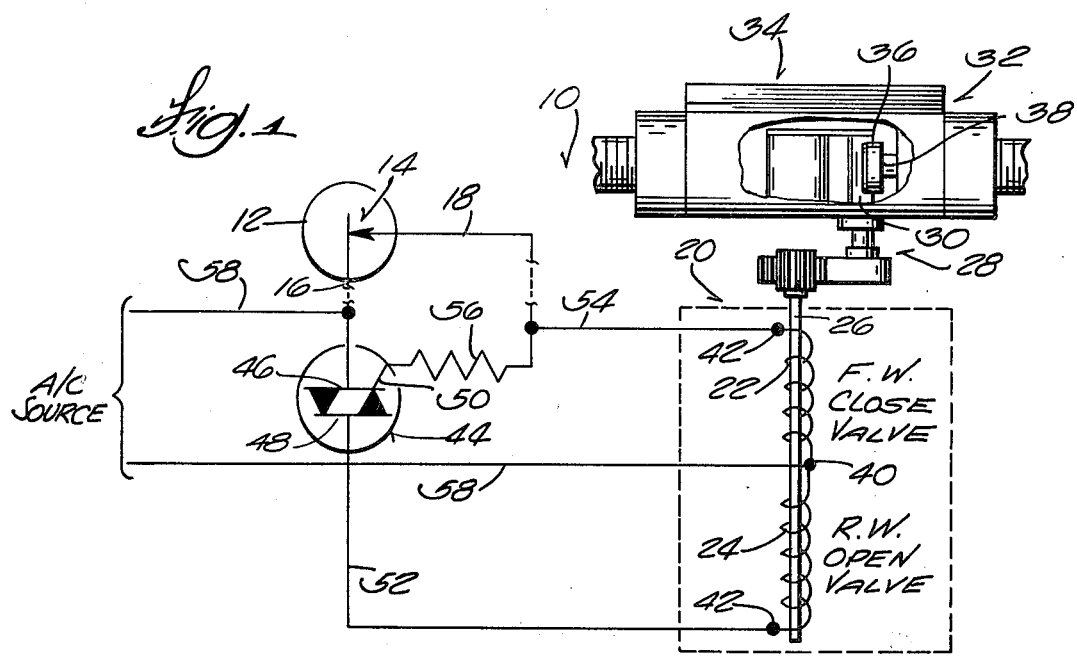
FIG. 1 is a partially schematic and diagrammatic view of an electronic reversible motor operated valve assembly embodying various of the features of the invention.

Referring more particularly to the drawings, wherein like numerals refer to like parts throughout the several views, FIG. 1 shows an electronic reversible motor operated valve assembly 10 adapted to be controlled by a two-wire switch or conventional thermostat 12 having make or break contacts 14 respectively coupled to a first wire 16 and a second wire 18 which extend outwardly from the thermostat. The thermostat 12 can be remotely located with respect to the valve assembly and selectively provides a conducting state and a non-conducting state between the first and second wires.

The valve assembly 10 includes conventional reversible motor means, such as a reversible motor drive unit 20 (shown diagrammatically). While various arrangements are possible, the reversible motor drive unit 20 preferably comprises a pair of conventional hysteresis type motors (not shown) stacked one on top of the other. The hysteresis motors or reversible motor drive unit 20 includes forward and reverse motor windings 22 and 24 (shown schematically) mounted on a common, or commonly connected, rotatable motor drive shaft 26. Each of the motor windings includes a common end terminal 40 and a separate end terminal 42. The common end terminals 40 are coupled together.

The motor drive shaft 26 is operatively connected through conventional gear drive train means, generally designated 28, to a valve stem 30 which is sealingly journaled and extends into the valve casing 32 of a conventional two-way valve 34. A valve member 36 secured to the valve stem 30 is pivotally mounted within the valve casing 32 and is movable between closed and open positions into and out of engagement with a valve seat 38 to control fluid flow through the valve casing.

Alternate energizing of the forward and reverse motor windings effects rotation of the drive shaft 26 in opposite directions, and thereby effects pivoting of the valve stem and valve member between the closed and open positions. The hysteresis motors of the motor drive unit 20 are of the type which can be stalled without damage so that it is not necessary to disengage the drive shaft 26 from the valve member 36 when the valve member reaches its fully open or closed position. The reversible motor drive unit 20 can be mounted on the valve 34 by any suitable mounting means (not shown).

The valve assembly 10 also includes semiconductor switching means adapted to be biased on by an A/C voltage or power source, and which includes first, second, and third terminals. In the preferred construction, the semiconductor switching means comprises a conventional triac 44 having a first terminal or first annode 46, a second terminal or second annode 48, and a third terminal or gate 50.

The first annode 46 is coupled to the first wire 16 of the thermostat 12. The second annode 48 is coupled to the end terminal 42 of the reverse motor winding 24 by conductor or line 52. The third terminal or gate 50 is coupled to the second wire 18 of the thermostat 12 and to the end terminal 42 of the forward motor winding 22 by line 54. Specifically, the second wire 18 and the line 54 are both preferably coupled to a conventional current limiting resistance 56 which, in turn, is coupled to the gate 50.

The coupled together common end terminals 40 and the first annode 46 are preferably coupled to a conventional 120 volt A/C source (not shown) by conductors or lines 58. The common end terminals 40 and the first annode 46 are adapted for coupling to the A/C power source to afford biasing the semiconductor switching means or triac 44, and to afford alternately energizing the forward and reverse motor windings 22 and 24 as will be explained in the Description of Operation below.

Figure 2:
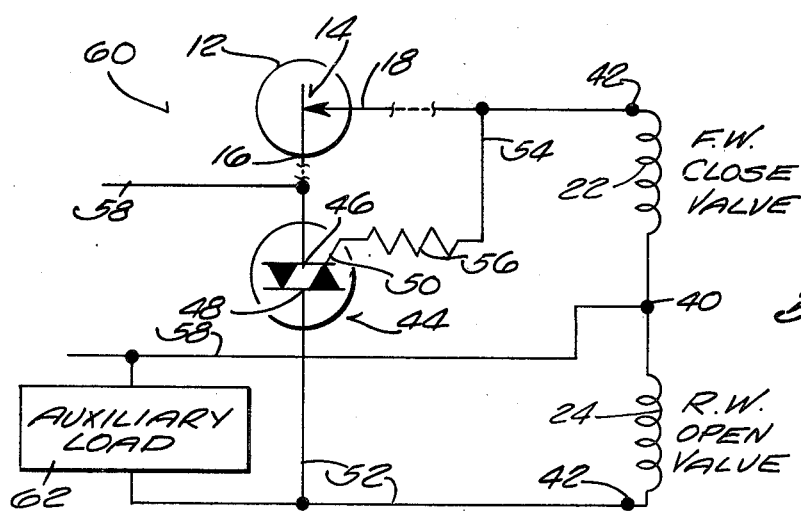
FIG. 2 is a schematic view of a portion of the valve assembly shown in FIG. 1 illustrating an alternative embodiment of the invention.

FIG. 2 illustrates a valve assembly 60 (partially shown, i.e. the motor shaft and valve are omitted) which differs from the valve assembly 10 in that it includes an auxiliary load, generally designated 62. As illustrated, the auxiliary load is coupled to the common end terminals 40 and to the separate end terminal 42 of the reverse motor winding 24. The auxiliary load can comprise any relatively large or suitable load such as a fan or pump motor. As will be described below, the auxiliary load is preferably energized by being coupled to the A/C power source through the triac when the valve member is in its open position.

Figure 3:
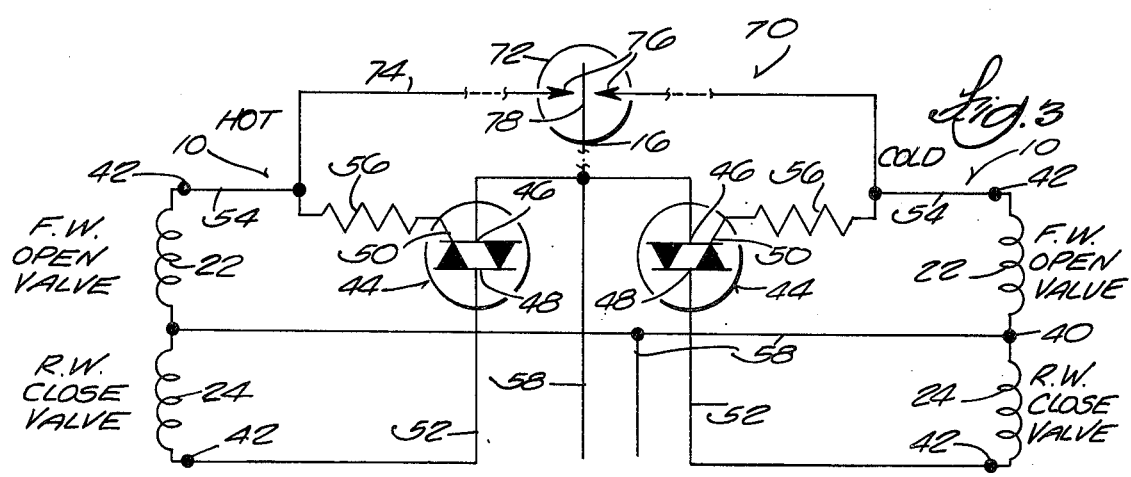
FIG. 3 is a schematic view of an electronic reversible motor operated dual valve assembly illustrating another alternative embodiment of the invention.

FIG. 3 illustrates an electronic reversible motor operated dual valve assembly 70 which includes a pair of the previously described valve assemblies 10 (partially shown) and which is adapted to be controlled by a three-wire switch or thermostat 72. The thermostat 72 includes a first wire 16, a second wire 18, and a thrid wire 74. The thermostat 72 is conventional in nature and includes, for example, cold and hot contacts 76 respectively coupled to the second wire 18 and to the third wire 74. The thermostat includes a center contact 78 suitable coupled to the first wire 16. As should be well understood by those skilled in the art, the thermostat 72 alternately provides a conducting state between the first and second wires 16 and 18, a dead band or simultaneous non-conducting state between the first and second wires 16 and 18, and between the first and third wires 16 and 74, and a conducting state between the first and third wires 16 and 74.

As illustrated in FIG. 3, each of the valve assemblies 10 are respectively coupled to the first and second, and to the first and third wires of the thermostat 72 in substantially an identical manner as the single valve assembly 10 is coupled to the first and second wires of the thermostat 12 shown in FIG. 1. Further, each of the valve assemblies 10 are adapted for coupling to a conventional 120 volt A/C power source by conductors or lines 58 in substantially an identical manner as the single valve assembly 10 is coupled to the A/C power source as shown in FIG. 1.

For purposes of example only, specific designations of components which could be utilized in the valve assembly 10 are as follows:

Triac 44: 2N6071A Motorola
Resistance 56: 39,000 OHMS
Reversible Motor: Two Hysteresis type
    Drive Unit 20: 50/60 cycle Motors

DESCRIPTION OF OPERATION

The present invention is particularly adapted for use in heating and/or cooling systems wherein a valve is required for controlling the flow of a fluid such as hot or cold water.

For purposes of example only, a cooling system utilizing the reversible motor operated valve assembly will be described. The thermostat 12 selectively provides non-conducting and conducting states between the first and second wires at predetermined upper and lower temperatures, respectively. The operation of the valve assembly is controlled by the thermostat, i.e. when the thermostat provides the non-conducting state, the triac is biased on and the valve member is pivoted to its open position, when the thermostat provides the conducting state, the triac is biased off and the valve member is pivoted to its closed position.

More specifically, assume a point in operation wherein the temperature of the space to be regulated increases to or above the upper temperature, e.g. 72 degrees. The temperature requirement for the thermostat is then not satisfied so that the thermostat contacts open to provide the non-conducting state between the first and second wires 16 and 18. When the thermostat contacts open, the first annode 46 and the gate 50 of the triac are not longer coupled at the same potential or shorted out by the forward motor winding 22. Instead, the first annode 46 and the gate 50 are coupled across the two lines 58 of the A/C power source so that the triac is biased "on."

As a result, the triac will conduct between the first and second annodes, and hence the reverse motor winding 24 is energized by being coupled to the A/C power source through the triac. Energizing of the reverse motor winding 24 effects rotation of the motor drive shaft 26 in a first direction, and thereby effects pivoting the valve member 36 to the open position. When the valve is pivoted to the open position, cold water flows through the valve casing 32 and into a cooling unit (not shown) to reduce the temperature of the space regulated.

When the temperature of the space regulated has been reduced to the predetermined lower temperature, e.g. 68 degrees, the thermostat is satisfied and the contacts close, thereby providing the conducting state between the first and second wires. As a result, the first annode 46 and the gate 50 of the triac 44 are coupled to one line of the A/C power source at the same potential, and are shorted out by the forward motor winding 22 so that the triac is biased off, de-energizing the reverse motor winding 24. At the same time, the forward motor winding 22 is energized by being coupled to the A/C power source through the thermostat 12.

Energizing of the forward motor winding 22 effects rotation of the motor drive shaft 26 in an opposite direction, and thereby effects pivoting the valve member 36 to the closed position preventing the flow of cold water through the valve casing and into the cooling unit. When the temperature of the space regulated again increases up to the predetermined upper temperature, the thermostat contacts open, the forward motor winding is de-energized, and the cooling cycle as described above repeats.

The effect of the opposing voltage which exists in the de-energized motor winding as a result of the triac gate current or transformer effect, is negligible on the output torque of the motor drive shaft. It should be understood, however, that the relatively small opposing voltages which occur tend to insure that the motor windings and the motor drive unit are maintained at a slightly elevated temperature, thereby substantially reducing the corrosion which might otherwise result from condensation occuring in conjunction with the cooling system.

The operation of the valve assembly 60 shown in FIG. 2 is substantially the same as the operation of the valve assembly 10 described above. As noted earlier, however, the valve assembly 60 includes an auxiliary load 62 which can comprise a relatively large load such as a fan or pump motor adapted to be utilized in the cooling unit. The auxiliary load 62 is energized by being coupled to the A/C power source through the triac at the same time the reverse motor winding is energized to pivot the valve member 36 to its open position.

Since the current flowing through the auxiliary load flows through the triac, but does not flow through the contacts 14 of the thermostat 12, the allowable capacity of the auxiliary load is dependent only on the capacity of the triac. Hence, the thermostat 12, which need only be sized for pilot duty or to handle the current flowing through the forward motor winding, can be utilized to control or switch a relatively large auxiliary load without requiring the use of an additional power relay. It is to be understood that the size or capacity of the triac 44 should be chosen to match the capacity required for its end use to thereby minimize the cost of the valve assembly.

The electronic reversible motor operated dual valve assembly 70 shown in FIG. 3 includes two valve assemblies 10 (partially shown). The dual valve assembly is particularly adapted for use in a combined heating and cooling system, for example, wherein the two valve assemblies respectively control the flow of hot and cold water. As noted earlier, the dual valve assembly is adapted to be controlled by the three-wire thermostat 72.

The operation of the dual valve assembly is generally the same in principal as the operation of the single valve assembly previously described. The motor drive unit, or gear drive train means, or valve is conventionally selected or modified, however, so that biasing the triac on and energizing the reverse motor winding effects pivoting the valve member to its closed position (rather than to an open position as previously described) and so that biasing the triac off and energizing the forward motor winding effects pivoting the valve member to its open position (rather than to the closed position). This modification is necessary to prevent both of the valve members being pivoted to the open position at the same time, since both triacs are biased on when the thermostat 72 provides a dead band or simultaneous non-conducting state.

For purposes of this description, the valve assembly 10 coupled to the first and second wires of the thermostat 72 will be designated the cold valve assembly, and the other valve assembly 10 coupled to the first and third wires of the thermostat will be designated the hot valve assembly. When the temperature of the space to regulated rises above a predetermined upper temperature so that the thermostat 72 is not satisfied, the cold contact 76 and center contact 78 close to provide a conducting state between the first and second wires 16 and 18. Hence, the cold assembly triac is biased off and the cold forward motor winding is energized to effect pivoting the cold assembly valve member to an open position affording the flow of cold water into a cooling unit. At the same time, a non-conducting state exists between the first and third wires so that the hot assembly triac is biased on, thereby energizing the hot reverse motor winding to effect pivoting of the hot valve member to the closed position to prevent the flow of hot water into a heating unit.

When the temperature of the space regulated has decreased from the predetermined upper limit, the thermostat is satisfied and enters a dead band, i.e. the hot and cold contacts 76 are open and the thermostat provides a simultaneous non-conducting state between both the first and second wires and the first and third wires. At this point in operation, both the cold and hot assembly triacs are biased on to afford energizing both the reverse motor windings, and to thereby effect pivoting both the cold and hot valve members to closed positions preventing the flow of either cold or hot water so that no heating or cooling occurs.

If the temperature of the space regulated drops below a predetermined lower temperature, a heating cycle rather than a cooling cycle takes place. Specifically, the hot contact 76 and center contact 78 close to provide a conducting state between the first and third wires 16 and 74, thereby biasing the hot assembly triac off and energizing the hot forward motor winding to effect pivoting the hot valve member to an open position to afford flow of hot water into a heating unit. At the same time, a non-conducting state exists between the first and second wires and the cold assembly triac is biased on, thereby energizing the reverse motor winding of the cold valve assembly to effect pivoting of the cold valve member to the closed position to prevent flow of cold water into a cooling unit. After the temperature increases, the thermostat again enters a dead band and remains at that point until the temperature of the space regulated again rises or falls above or below the upper or lower temperature limits, at which point a cooling cycle or heating cycle, respectively, will be repeated.

It should now be readily appreciated that the invention disclosed herein provides the relatively increased reliability of solid state semiconductor switching means while the need for a relatively expensive three-wire switch, or for a two-wire switch including additional contacts and a relay, has been eliminated. Further, it should be appreciated that the semiconductor switching means and current limiting resistance can be arranged and located in a more compact space than the prior art contact and relay arrangement which has previously been required with a two-wire switch.

It is to be understood that the invention is not limited in its application to the details of construction and the description of operation set forth in the preceding general description. The invention is capable of other embodiments and of being practiced and carried out in various ways. For example, the valve assembly could be adapted to operate with a 24 volt A/C power source or 240 volt A/C power source. Other auxiliary loads could be utilized and the value of the current limiting resistance can be changed to effect proper biasing of the triac, if necessary.

Further, other separate motors or motor drive units having first and second motor windings could be utilized with other differently structured valve arrangements, or valves, having differently structured valve members adapted for controlling or damping the flow of other fluids, for example, such as hot or cold air. Thus, the invention is not confined to the particular construction and arrangement of parts herein illustrated and described, but is intended to embrace all such modified forms thereof as come within the scope of the following claims.

I claim:

1. An electronic motor operated valve assembly adapted to be controlled by a switch having first and second wires, the switch selectively providing a conducting state and a non-conducting state between the wires, said assembly comprising:

first and second motor windings each having a common end terminal and a separate end terminal, said common end terminals being coupled together;

a single three-terminal semiconductor switching means adapted to be biased on by an A/C power source and having first, second, and third terminals, said first terminal being coupled to the first wire of the switch, said second terminal being coupled to said separate end terminal of said second motor winding, and said third terminal being coupled to the second wire of the switch and to said separate end terminal of said first motor winding;

said first terminal and said coupled together common end terminals being adapted for coupling to an A/C power source to afford biasing said semiconductor switching means and to afford alternately energizing said motor windings, whereby, when said switch selectively provides the non-conducting state, said semiconductor switching means is biased on to conduct between said first and second terminals so that said second motor winding is energized by being coupled to the A/C power source through said semiconductor switching means, and whereby, when the switch provides the conducting state, said semiconductor switching means is biased off to become non-conductive between said first and second terminals, and said first motor winding is alternately energized by being coupled to the A/C power source through the switch.

2. An electronic motor operated valve assembly in accordance with claim 1 wherein said semiconductor switching means comprises a triac, said first, second, and third terminals respectively comprise a first annode, a second annode, and a gate, and said assembly further comprises a current limiting resistance coupled between said gate and said separate end terminal of said first motor winding.

3. An electronic motor operated valve assembly in accordance with claim 1 further comprising an auxiliary load coupled to said second terminal of said semiconductor switching means and to said coupled together common end terminals, whereby said auxiliary load is energized by being coupled to the A/C power source through said semiconductor switching means when the switch selectively provides the non-conducting state.

4. An electronic motor operated valve assembly in accordance with claim 1 further comprising a valve casing including a pivotally mounted valve member secured to a valve stem and movable between an open and a closed position to control fluid flow through said valve casing, reversible motor means including a rotatable drive shaft upon which is mounted said first and second motor windings, alternate energizing of said motor windings effecting rotation of said drive shaft in opposite directions, gear drive train means operatively connecting said drive shaft to said valve stem and said valve member, whereby when the switch selectively provides the nonconducting state and said second motor winding is energized, said drive shaft is rotated in a first direction and said valve member is pivoted to one of said open and closed positions, and whereby when the switch selectively provides the conducting state and said first motor winding is alternately energized, said drive shaft is rotated in an opposite direction and said valve member is pivoted to the other one of said open and closed positions.

5. An electronic motor operated valve assembly in accordance with claim 4 wherein said second motor winding comprises a reverse motor winding which, when energized, effects pivoting of said valve member to said open position, wherein said first motor winding comprises a forward motor winding which, when energized, effects pivoting of said valve member to said closed position, said assembly further comprising an auxiliary load coupled to said second terminal of said switching means and to said coupled together common end terminals, whereby when said reverse motor winding is energized and said valve is pivoted to said open position, said auxiliary load is energized by being coupled to the A/C power source through said semiconductor switching means.

6. An electronic motor operated valve assembly in accordance with claim 1, adapted to be controlled by the switch of claim 1 further including a third wire, the switch selectively alternatively providing a conducting state between the first and second wires, a simultaneous non-conducting state between the first and second wires and between the first and third wires, and a conducting state between the first and third wires, said valve assembly further comprising, a second valve assembly substantially identical to the first valve assembly specified in claim 1, said second valve assembly being respectively coupled to the first and third wires of the switch in substantially an identical manner as said first valve assembly is respectively coupled to the first and second wires of the switch, said second valve assembly being adapted for coupling to the A/C power source in substantially an identical manner as said first valve assembly is adapted for coupling to the A/C power source, whereby, when the switch selectively provides the simultaneous non-conducting state, said second motor windings of both of said valve assemblies are energized, whereby, when the switch provides the conducting state between the first and second wires, said first motor winding of said first valve assembly and said second motor winding of said second valve assembly are energized, and whereby, when the switch provides the conducting state between the first and third wires, said first motor winding of said second valve assembly and said second motor winding of said first valve assembly are energized.

7. An electronic motor operated valve assembly in accordance with claim 6, wherein each of said first and second valve assemblies further comprise a valve casing including a pivotally mounted valve member secured to a valve stem and movable between an open and a closed position to control fluid flow through said valve casing, reversible motor means including a rotatable drive shaft upon which is mounted said first and second motor windings, gear drive train means operatively connecting said drive shaft to said valve stem and said valve member, said second motor winding comprising a reverse motor winding which, when energized, effects rotation of said drive shaft in a first direction and pivots said valve member to said closed position, said first motor winding comprising a forward motor winding which, when energized, effects rotation of said drive shaft in an opposite direction and pivots said valve member to said open position, whereby when the switch selectively provides the simultaneous non-conducting state, both of said valve members of said valve assemblies are pivoted to said closed position, whereby when the switch provides a conducting state between the first and second wires, said valve member of said first assembly is pivoted to said open position and said valve member of said second assembly is pivoted to said closed position, and whereby when the switch provides the conducting state between the first and third wires, said valve member of said second assembly is pivoted to said open position and said valve member of said first assembly is pivoted to said closed position.

8. An electronic reversible motor operated valve assembly adapted to be controlled by a switch having first and second wires, the switch selectively providing a conducting state and a non-conducting state between the wires, said assembly comprising a valve casing including a pivotally mounted valve member secured to a valve stem and movable between an open and a closed position to control fluid flow through said valve casing, reversible motor means including a rotatable drive shaft, gear drive train means operatively connecting said drive shaft to said valve stem and said valve member, forward and reverse motor windings mounted on said drive shaft and each having a common end terminal and a separate end terminal, said common end terminals being coupled together, alternative energizing of said motor windings effecting rotation of said drive shaft in opposite directions, a triac having a first annode, a second annode, and a gate, said first annode being coupled to the first wire of the switch, said second annode being coupled to said separate end terminal of said reverse motor winding, and said gate being coupled to the second wire of the switch and to said separate end terminal of said forward motor winding, a current limiting resistance coupled between said gate and said separate end terminal of said forward winding, said first annode and said coupled together common end terminals being adapted for coupling to an A/C power source to afford biasing said triac and to afford alternately energizing said motor windings, whereby, when the switch selectively provides the non-conducting state, said triac is biased on to conduct between said first and second annodes so that said reverse motor winding is energized by being coupled to the A/C power source through said triac, energizing of said reverse motor winding effecting rotation of said drive shaft in a first direction and pivoting said valve member to one of said open and closed positions, and whereby, when the switch selectively provides the conducting state, said triac is biased off to become non-conductive between said first and second annodes, and said forward motor winding is alternately energized by being coupled to the A/C power source through the switch, energizing of said forward motor winding effecting rotation of said drive shaft in an opposite direction and pivoting said valve member to the other one of said open and closed positions.

9. A thermostatically controlled electronic reversible motor operated valve system comprising, a thermostat having first and second wires, said thermostat selectively providing a conducting state and a non-conducting state between said wires, and a valve assembly including a valve casing including a pivotally mounted valve member secured to a valve stem and movable between an open and a closed position to control fluid flow through said valve casing, reversible motor means including a rotatable drive shaft, gear drive train means operatively connecting said drive shaft to said valve stem and said valve member, forward and reverse motor windings mounted on said drive shaft and each having a common end terminal and a separate end terminal, said common end terminals being coupled together, alternative energizing of said motor windings effecting rotation of said drive shaft in opposite directions, a triac having a first annode, a second annode, and a gate, said first annode being coupled to said first wire of said thermostat, said second annode being coupled to said separate end terminal of said reverse motor winding, and said gate being coupled to said second wire of said thermostat and to said separate end terminal of said forward motor winding, a current limiting resistance coupled between said gate and said separate end terminal of said forward motor winding, said first annode and said coupled together common end terminals being adapted for coupling to an A/C power source to afford biasing said triac and to afford alternately energizing said motor windings, whereby, when said thermostat selectively provides the non-conducting state, said triac is biased on to conduct between said first and second annodes so that said reverse motor winding is energized by being coupled to the A/C power source through said triac, energizing of said reverse motor winding effecting rotation of said drive shaft in a first direction and pivoting said valve member to one of said open and closed positions, and whereby, when said thermostat selectively provides the conducting state, said triac is biased off to become non-conductive between said first and second annodes, and said forward motor winding is alternately energized by being coupled to the A/C power source through said thermostat, energizing of said forward motor winding effecting rotation of said drive shaft in an opposite direction and pivoting said valve member to the other one of said open and closed positions.

10. A thermostatically controlled electronic reversible motor operated valve system in accordance with claim 9 wherein said reverse motor winding, when energized, effects pivoting of said valve member to said open position, wherein said forward motor winding, when energized, effects pivoting of said valve member to said closed position, said valve system further comprising an auxiliary load coupled to said second annode of said triac and to said coupled together common end terminals, whereby when said reverse motor winding is energized and said valve is pivoted to said open position, said auxiliary load is energized by being coupled to the A/C power source through said triac.

11. An electronic reversible motor operated valve system in accordance with claim 9, wherein said thermostat further includes a third wire, said thermostat selectively alternatively providing a conducting state between said first and second wires, a simultaneous non-conducting state between said first and second wires and between said first and third wires, and a conducting state between said first and third wires, said valve system further comprising, a second valve assembly substantially identical to the first valve assembly specified in claim 9, said second valve assembly being respectively coupled to said first and third wires of said thermostat in substantially an identical manner as said first valve assembly is respectively coupled to said first and second wires of said thermostat, said second valve assembly being adapted for coupling to the A/C power source in substantially an identical manner as said first valve assembly is adapted for coupling to the A/C power source, whereby, when said thermostat selectively provides the simultaneous non-conducting state, said reverse motor windings of both of said valve assemblies are energized to effect pivoting of both of said valve members to said closed position, whereby, when said thermostat provides the conducting state between said first and second wires, said forward motor winding of said first valve assembly and said reverse motor winding of said second valve assembly are energized to effect pivoting of said first valve assembly valve member to said open position and to effect pivoting of said second valve assembly valve member to said closed position, and whereby, when said thermostat provides the conducting state between said first and third wires, said forward motor winding of said second valve assembly and said reverse motor winding of said first valve assembly are energized to effect pivoting of said second valve assembly valve member to said open position and to effect pivoting of said first valve assembly valve member to said closed position.

* * * * *